(12) United States Patent
Everson et al.

(10) Patent No.: US 6,938,010 B1
(45) Date of Patent: Aug. 30, 2005

(54) METHOD OF OPTIMIZING MARKET AND INSTITUTIONAL RISKS IN FOREIGN EXCHANGE HEDGING

(75) Inventors: Mark Paul Everson, Canton, MI (US); Christophe G. Mangin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/532,560

(22) Filed: Mar. 22, 2000

(51) Int. Cl.[7] ............................................. G06F 17/60
(52) U.S. Cl. .......................................... 705/36; 705/35
(58) Field of Search ..................................... 705/36, 35

(56) References Cited

U.S. PATENT DOCUMENTS

| | | | |
|---|---|---|---|
| 5,222,192 A | 6/1993 | Shaefer | |
| 5,799,287 A | 8/1998 | Dembo | |
| 5,812,988 A * | 9/1998 | Sandretto | ..................... 705/36 |
| 5,877,966 A | 3/1999 | Morris et al. | |
| 6,003,018 A | 12/1999 | Michaud et al. | |
| 6,018,722 A | 1/2000 | Ray et al. | |
| 6,278,981 B1 | 8/2001 | Dembo et al. | |
| 6,292,787 B1 * | 9/2001 | Scott et al. | ..................... 705/36 |
| 2003/0078867 A1 * | 4/2003 | Scott et al. | ..................... 705/36 |
| 2003/0088489 A1 * | 5/2003 | Peters et al. | ..................... 705/36 |

FOREIGN PATENT DOCUMENTS

| | | | | |
|---|---|---|---|---|
| EP | 0790568 A1 * | 2/1997 | ............ | G06F 17/60 |

* cited by examiner

Primary Examiner—Jagdish N Patel
(74) Attorney, Agent, or Firm—Bliss McGlynn P.C.; Damian Porcari

(57) ABSTRACT

A method is provided of optimizing both market and institutional risks in foreign currency exchange hedging. The method includes the steps of selecting a VaR calculator and determining an optimization procedure to be used. The method also includes the steps of using the VaR calculator and the optimization procedure to determine an efficient frontier line and choosing trade-offs between institutional risk and market risk of losses.

5 Claims, 2 Drawing Sheets

METHOD OF OPTIMIZING MARKET AND INSTITUTIONAL RISKS IN FOREIGN EXCHANGE HEDGING

BACKGROUND OF THE INVENTION

1. Field of the Invention

The present invention relates generally to methods of doing business and, more specifically, to a method of optimizing both market and institutional risks in foreign exchange hedging.

2. Description of the Related Art

Institutions are frequently subjected to foreign currency exchange risks anytime a contract involving future flows of money between countries is entered into. The typical approach to measuring and acting upon foreign currency exchange risk involves a combination of management judgment, techniques like value-at-risk (VaR), and other methodologies known in the art. Usually these different approaches are combined in an ad hoc manner that does not necessarily produce the best result in terms of a hedging (risk reduction) strategy.

Institutions such as corporations that typically sell their products on an international basis must deal with the risks associated with future currency exchange rate changes. A variety of market instruments, such as forwards and options known in the art, enable an international corporation to reduce its foreign currency exchange risk. Typically, international corporations use methods including senior management judgment, value-at-risk (VaR), and other techniques to determine the amount of risk they are willing to undertake given an amount of potential cost or expected return. These approaches all suffer disadvantages of one sort or another.

Management judgment will typically include factors like to what extent losses on the hedging instruments themselves will imperil the future existence of the hedging or risk reduction program. Management judgment also considers whether locking in a particular future currency exchange rate with a forward contract would, through higher local prices, adversely affect the competitive position in that country. Management judgment, although frequently good for an individual currency pairing, usually fails to include expected correlations in movements between numerous other currency pairs.

Value-at-risk (VaR) methods known in the art generally include forecasts for these correlations, so that a corporation's entire foreign currency exchange exposure can be treated holistically. However, these VaR methods do not typically include the type of information cited above under management judgment.

Among the main concerns of most hedging strategies is the reduction of aggregate risk to the institution, while keeping the losses of the hedging itself within some limits. As a result, it is desirable to provide a method of optimizing both market and institutional risks in foreign exchange hedging. It is also desirable to provide an optimization framework for evaluating the risk of different hedging strategies using foreign currency exchange forwards.

SUMMARY OF THE INVENTION

Accordingly, the present invention is a method of optimizing both market and institutional risks in foreign currency exchange hedging. The method includes the steps of selecting a VaR calculator and determining an optimization procedure to be used. The method also includes the steps of using the VaR calculator and the optimization procedure to determine an efficient frontier line and choosing trade-offs between institutional risk and market risk of losses.

One advantage of the present invention is that a method of optimizing both market and institutional risks in foreign currency exchange hedging is provided. Another advantage of the present invention is that the method uses an optimization framework for evaluating the risk of different hedging strategies using foreign currency exchange forwards. Yet another advantage of the present invention is that the method uses an optimization, which is a combined fashion of the risk of the overall portfolio and the risks associated with the hedging itself.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
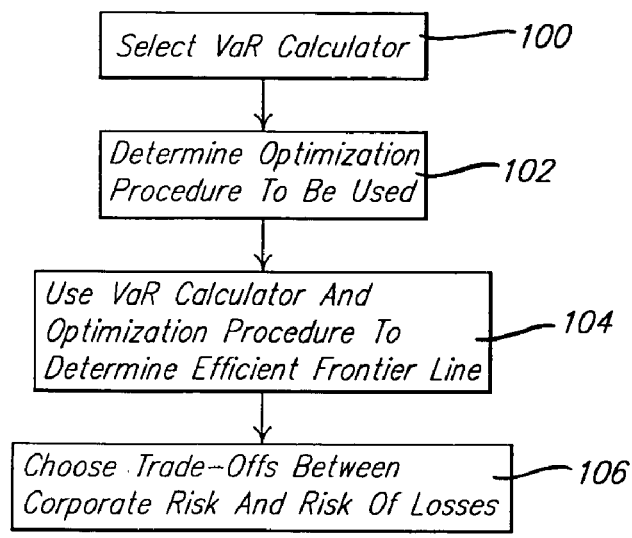
FIG. 1 is a flowchart of a method, according to the present invention, of optimizing both market and institutional risks in foreign currency exchange hedging.

Referring to the drawings and in particular FIG. 1, one embodiment of a method, according to the present invention, of optimizing both market and institutional risks in foreign currency exchange hedging is shown. The method is to be carried out on a computer system that includes a computer having a memory, a processor, a display and user input mechanism, such as a mouse or keyboard (not shown).

Figure 2:
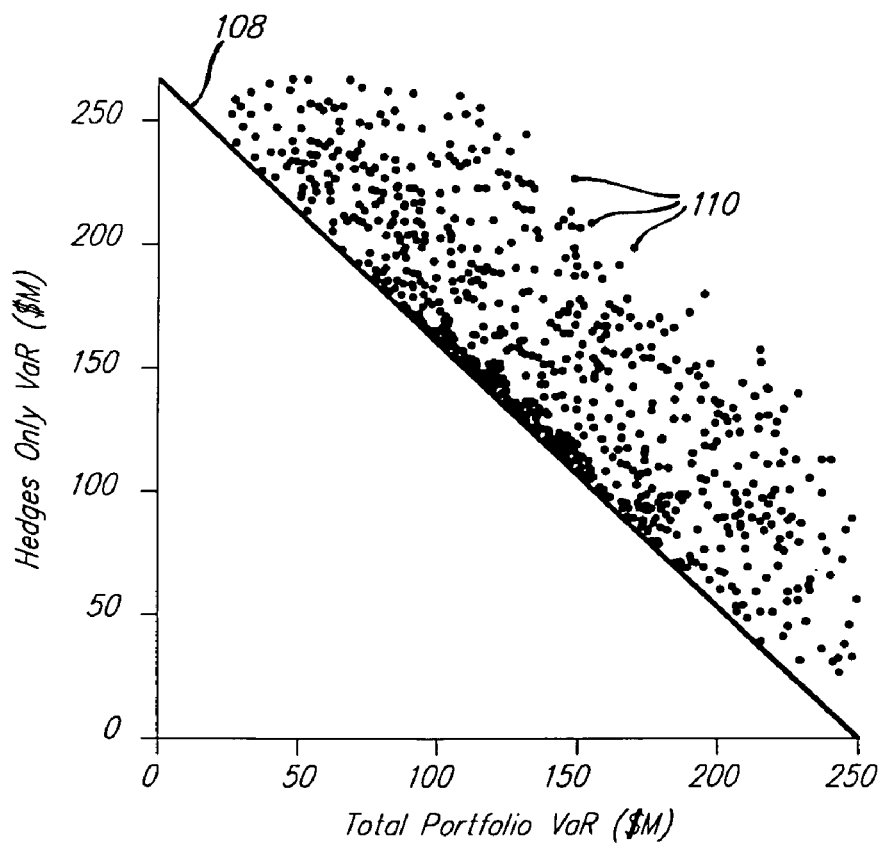
FIG. 2 is a graph of hedges only VaR versus total portfolio VaR for the method of FIG. 1.
Figure 3:
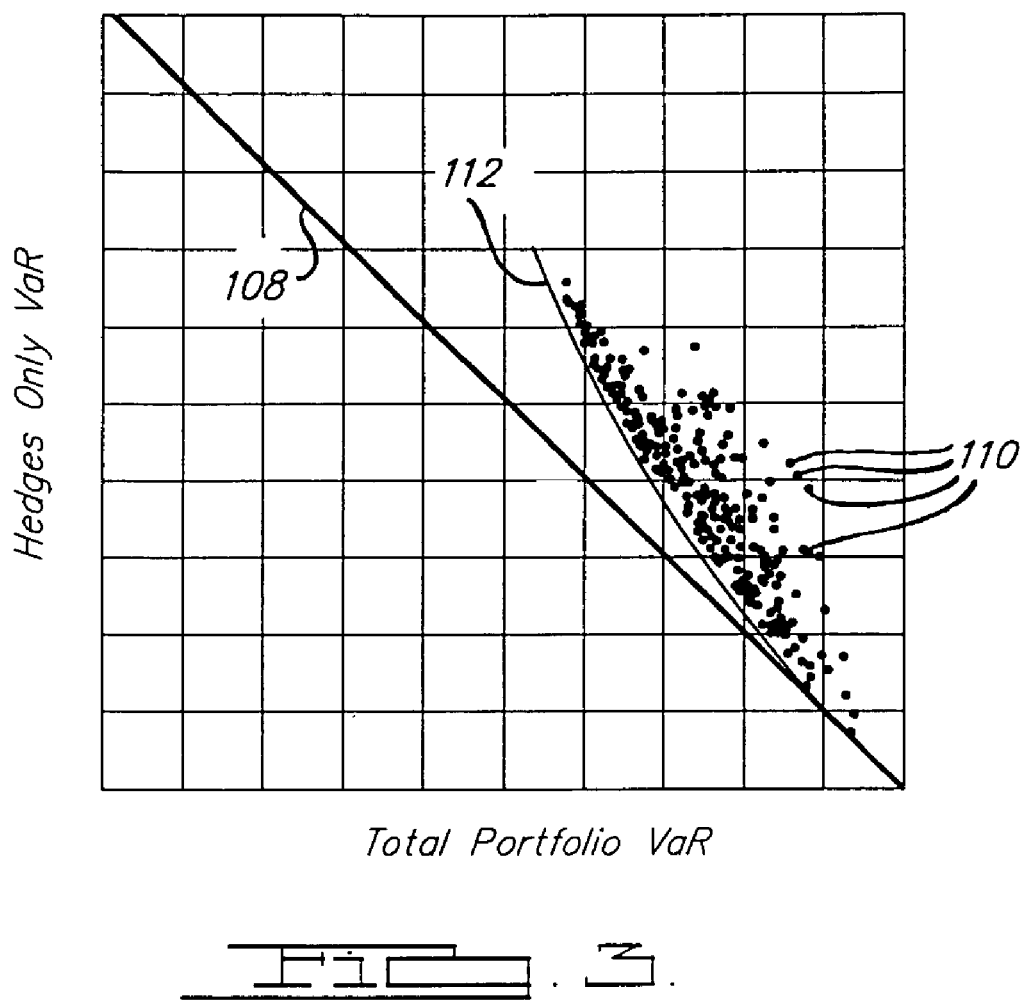
FIG. 3 is a graph of VaR hedges for the method of FIG. 1.

The method uses an optimization framework for evaluating the risk of different hedging strategies using foreign currency exchange forwards. The method is a consistent way to combine VaR and some of the management judgment factors cited previously. In the present invention, optimal portfolios are represented in two-dimensional (2d) space with one axis being the total (hedged) protfolio's VaR and the other axis being the VaR of the hedges (forwards) alone as illustrated in FIGS. 2 and 3. The VaR of the hedges alone is a projection of possible losses of the hedging itself. Effectively, this approach examines trade-offs between two types of risk. The total risk to an institution such as a corporation versus the risk of loss in the market by the hedging alone. Both of these parameters can be easily calculated for any portfolio using a conventional "VaR calulator" known in the art. The purpose of the VaR calculator is to simply apply the well-known statistical basis of value-at-risk calculations to the specific set of financial instruments in question. To calculate the VaR of the total (hedged) portfolio, both the future expected foreign currency exchange exposures and a hypothetical set of foreign currency exchange forwards (that hedge the specific exposures) are entered into the VaR calculator. The amount of a forward purchase for each exposure should be limited to between zero percent (0%) and one hundred percent (100%) of the exposure value. It should be appreciated that to exceed this range would enter the realm of currency speculation.

The VaR for the hedges alone (giving the risk of the hedging program itself) is then calculated separately. The best strategies are those with an acceptable level of risk for the overall or total portfolio, combined with minimal risk of losses in the hedging instruments themselves. An optimization procedure is used to find characteristic portfolios of that type. The final result of this procedure is a set of specific hedging actions, coupled with how good a result each procedure is in terms of aggregate institutional risk and market risk of the hedging program itself. Optimally, management views or judgment such as "we should not hedge this particular currency pair" can be included.

In the present invention, the method starts in block 100 and selects an acceptable commercial VaR calculator or uses one from an external file such as a spreadsheet program, based upon business judgment of their suitability for calculation of the institution's foreign currency exchange risk. The external file may be stored on a server memory, the memory of a computer, a magnetic disk storage device, or any one of numerous other electronic or magnetic storage devices. The method advances to block 102 and determines the type of optimization procedure to be used based on a user's or practitioner's judgment of each method's efficiency in finding an optimal solution for the application at hand. The optimization procedures or techniques to be used include, but are not limited to, generic algorithms, dynamical programming, and neural networks as is known in the art. The method then advances to block 104. It should be appreciated that any restrictions on hedging of specific currency pairs due to management judgment must be handled within the optimization procedure.

Next, in block 104, the method uses the VaR calculator and optimization procedure together to determine an "efficient frontier" line on which all the optimal portfolios will exist in the two-dimensional (2d) space as previously described. In one example, the efficient frontier line exists as a boundary toward the lower left where one goes from an area containing portfolios, as illustrated by the points in FIGS. 2 and 3, to an area devoid of possible portfolios. Each portfolio on the efficient frontier consists of a simple list of at what percentage each exposure will be hedged, from zero percent (0%) to one hundred percent (100%). The method advances to block 106 and, once a range of optimal portfolios is selected, the method chooses between these optimal portfolios using management judgment of the trade-offs between institutional risk and the market risk of loss due to the hedging. It should be appreciated that management judgment is used to choose between tradeoffs in total portfolio risk and hedging risk.

In one embodiment of the VaR calculator, if all exposures are allowed to be hedged anywhere in the range from 0% to 100%, the efficient hedged portfolios all fall on the efficient frontier line. This line is composed of portfolios where every exposure is hedged at the same percentage. This "equal weight" efficient frontier line is shown as a bold straight line 108 as illustrated in FIG. 2. It should be appreciated that this result is not necessarily going to occur for other types of VaR calculators.

As illustrated in FIG. 2, one example of the present invention uses a portfolio containing approximately forty (40) exposures (each a different currency pairing). Each point 110 illustrated in FIG. 2 is a single hedged portfolio with from 0% to 100% of each exposure hedged using forwards. Only a very small subset of all possible portfolios have been calculated and plotted. Those calculated are sufficient to indicate the location of the efficient frontier line. It should be appreciated that calculation of all possible portfolios is computationally prohibitive. It should also be appreciated that the efficient frontier line is the straight line 108 slanting down to the right.

As illustrated in FIG. 3, another example of the present invention using a portfolio containing only a few exposures, where hedging of a particular exposure is expressly prohibited due to management judgment (so that exposure's hedging percentage will always equal 0%). In this example, the efficient frontier line consists of a curved line 112 and the points 110 on the curved line 112 representing the efficient frontier line have a higher risk than those on the straight line 108 representing the equal weight efficient frontier line as illustrated in FIG. 2. From FIG. 3, management judgment can now determine whether acting based on their view, which called for foregoing hedging of a particular currency pair, is worth the increased risk. It should be appreciated that no scales are shown in FIG. 3 and the axes are the same as in FIG. 2.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A computer implemented method of optimizing market and institutional risks in foreign currency exchange hedging, said method comprising the steps of:
   providing a computer system;
   selecting a VaR (Value-at-Risk) calculator using the computer system;
   determining an optimization procedure to be used with the computer system;
   determining by the computer system an efficient frontier line on which optimal portfolios exist in two-dimensional space, using the VaR calculator and the optimization procedure;
   selecting a range of the optimal portfolios with the computer system; and
   choosing between the optimal portfolios in the range based on trade-offs between institutional risk and market risk of losses due to hedging.

2. A computer implemented method as set forth in claim 1 wherein said step of selecting comprises selecting the VaR calculator based on judgment of its suitability for calculation of the institution's foreign currency exchange risk.

3. A computer implemented method as set forth in claim 1 wherein said step of determining comprises determining the optimization procedure based on a user's judgment of each method's efficiency in finding optimal solutions for the application at hand.

4. A computer implemented method as set forth in claim 1 wherein each portfolio on the efficient frontier line is a percentage to be hedged from zero percent to one hundred percent.

5. A computer implemented method of optimizing market and institutional risks in foreign currency exchange hedging, said method comprising the steps of:
   providing a computer system;
   selecting a VaR calculator using the computer system;
   determining an optimization procedure to be used with the computer system;
   determining by the computer system an efficient frontier line on which optimal portfolios exist in two-dimensional space, using the VaR calculator and the optimization procedure;
   selecting a range of the optimal portfolios with the computer system; and
   choosing between the optimal portfolios in the range using management judgment between trade-offs in total portfolio risk and hedging risk.

* * * * *